United States Patent
Park et al.

(10) Patent No.: US 9,572,128 B2
(45) Date of Patent: Feb. 14, 2017

(54) METHOD AND DEVICE FOR PERFORMING RANGING

(75) Inventors: Gi Won Park, Anyang-si (KR); Jin Sam Kwak, Anyang-si (KR); Young Soo Yuk, Anyang-si (KR); Jin Soo Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 457 days.

(21) Appl. No.: 13/598,159

(22) Filed: Aug. 29, 2012

(65) Prior Publication Data

US 2013/0058289 A1   Mar. 7, 2013

Related U.S. Application Data

(60) Provisional application No. 61/530,409, filed on Sep. 2, 2011, provisional application No. 61/532,538, filed on Sep. 8, 2011, provisional application No. 61/545,201, filed on Oct. 10, 2011, provisional application No. 61/549,247, filed on Oct. 20, 2011.

(51) Int. Cl.
*H04W 68/00* (2009.01)
*H04W 4/00* (2009.01)

(52) U.S. Cl.
CPC ............. *H04W 68/00* (2013.01); *H04W 4/005* (2013.01)

(58) Field of Classification Search
CPC .. H04W 68/00; H04W 28/0215; H04W 4/005; H04W 72/048; H04W 84/18; H02M 7/537; H04L 67/12; G01D 5/00
See application file for complete search history.

(56) References Cited

U.S. PATENT DOCUMENTS

| | | | | |
|---|---|---|---|---|
| 6,160,805 A | * | 12/2000 | Averbuch | H04W 76/04 370/350 |
| 2006/0009242 A1 | | 1/2006 | Ryu et al. | |
| 2011/0075604 A1 | | 3/2011 | Fong et al. | |
| 2011/0274040 A1 | * | 11/2011 | Pani et al. | 370/328 |
| 2012/0230302 A1 | * | 9/2012 | Calcev et al. | 370/336 |
| 2012/0231828 A1 | * | 9/2012 | Wang | H04W 74/04 455/509 |
| 2014/0056229 A1 | * | 2/2014 | Li et al. | 370/329 |

FOREIGN PATENT DOCUMENTS

| | | |
|---|---|---|
| CN | 102143494 A | 8/2011 |
| WO | 2009157650 | 12/2009 |
| WO | 2011003195 | 1/2011 |

OTHER PUBLICATIONS

"IEEE 802.16p Machine to Machine (M2M): Proposed Text from Power Saving (PWR) Rapporteur Group; C80216p-11_0002r1", IEEE Draft; C80216P-11_0002R1, IEEE-SA, Piscataway, NJ USA, vol. 802.16p, Mar. 3, 2011 (Mar. 3, 2003), pp. 1-17, XP017614499.

(Continued)

*Primary Examiner* — Andrew Lai
*Assistant Examiner* — M Mostazir Rahman
(74) *Attorney, Agent, or Firm* — Dentons US LLP

(57) ABSTRACT

A method and device for performing a dedicated ranging for Machine To Machine (M2M) communication is provided. A M2M device receives a paging message indicating a dedicated ranging channel allocation from a base station. The dedicated ranging channel allocation is valid within a dedicated channel allocation timer.

6 Claims, 6 Drawing Sheets

(56) References Cited

OTHER PUBLICATIONS

"Draft Amendment to IEEE Standard for Local and metropolitan area networks Part 16: Air Interface for Broadband Wireless Access Systems; P80216m_D10", Nov. 29, 2010 (Nov. 29, 2010), IEEE Draft; P80216M_D10, IEEE-SA, Piscataway, NJ USA, pp. 1-1132, XP017637087.
Jaesun Cha, et al., "Distribution of Initial Ranging Access for Network Reentry," IEEE C802.16p-11/0020, Mar. 6, 2011.
Jinsoo Choi, et al., "Proposed Text of Dedicated Ranging for M2M Devices in Network Re-entry," IEEE C802.16p-11/0094, May 8, 2011.
Jinsoo Choi, et al., "Proposed Text for Transmission of Dedicated Ranging Information and Signaling Support for M2M Devices," IEEE C802.16p-11/0168, Jul. 10, 2011.

* cited by examiner

METHOD AND DEVICE FOR PERFORMING RANGING

CROSS-REFERENCE TO RELATED APPLICATIONS

This application claims the benefit of priority of U.S. Provisional applications 61/530,409 filed on Sep. 2, 2011, 61/532,538 filed on Sep. 8, 2011, 61/545,201 filed on Oct. 10, 2011, and 61/549,247 filed on Oct. 20, 2011, all of which are incorporated by reference in their entirety herein.

BACKGROUND OF THE INVENTION

Field of the Invention

The present invention relates to wireless communications, and more particularly, to method and device for performing ranging for Machine To Machine (M2M) communication.

Related Art

Machine To Machine (M2M) communication is one type of data communication including one or more entities not requiring human interactions. M2M communication may also be called as Machine Type Communication (MTC). That is, the M2M communication refers to the concept of communication based on the existing wireless communication network used by a machine device that is not directly operated by a human. The machine device used in the M2M communication can be called a M2M device. There are various M2M devices such as a vending machine, a machine of measuring a water level at a dam, etc.

The M2M device has a feature different from that of a typical human-operated device. Therefore, a service optimized to the M2M communication may differ from a service optimized to human-to-human communication. In comparison with a conventional mobile network communication service, the M2M communication can be characterized as a different market scenario, data communication, less costs and efforts, a potentially great number of M2M devices, wide service areas, low traffic for each M2M device, etc.

Ranging is a procedure used to initiate or keep uplink synchronization. There are two types of ranging: initial ranging and periodic ranging. After downlink synchronization, the mobile station attempts to perform initial ranging with a base station. If the ranging procedure is successfully completed, the mobile station is uplink synchronized with the base station. Periodic ranging is the process of maintaining the correct mobile station's uplink transmission parameters.

Ranging is generally a contention based ranging in which collisions between mobile stations occur. For exampling, it is assumed that two mobile stations transmits same ranging codes via same ranging channels. The base station cannot receive all ranging codes or can receive only one ranging code. This means that one or more mobile stations re-transmits another ranging code after random backoff. The collision may occur when mobile stations performs ranging simultaneously.

To reduce possibility of collision in the contention based ranging, allocation of dedicated ranging channel has been proposed.

However, it is required to consider the M2M communication feature to perform ranging using the dedicated ranging channel.

SUMMARY OF THE INVENTION

The present invention provides a method and device for performing a ranging for Machine To Machine (M2M) communication.

In an aspect, a method for performing a dedicated ranging for Machine To Machine (M2M) communication is provided. The method includes entering, by a M2M device, into an idle mode, receiving, by the M2M device in the idle mode, a paging message indicating a dedicated ranging channel allocation from a base station, the paging message including dedicated ranging channel information and a dedicated channel allocation timer, and transmitting, by the M2M device, a ranging code to the base station in accordance with the dedicated ranging channel information. The dedicated ranging channel information is valid within a time duration indicated by the dedicated channel allocation timer.

In another aspect, a Machine To Machine (M2M) device configured for performing a dedicated ranging for M2M communication is provided. The M2M device includes a radio frequency unit for receiving and transmitting a radio signal and a processor operatively coupled with the radio frequency unit and configured to enter into an idle mode, receive a paging message indicating a dedicated ranging channel allocation from a base station, the paging message including dedicated ranging channel information and a dedicated channel allocation timer, and instruct the radio frequency unit to transmit a ranging code to the base station in accordance with the dedicated ranging channel information. The dedicated ranging channel information is valid within a time duration indicated by the dedicated channel allocation timer.

DESCRIPTION OF EXEMPLARY EMBODIMENTS

Figure 1:
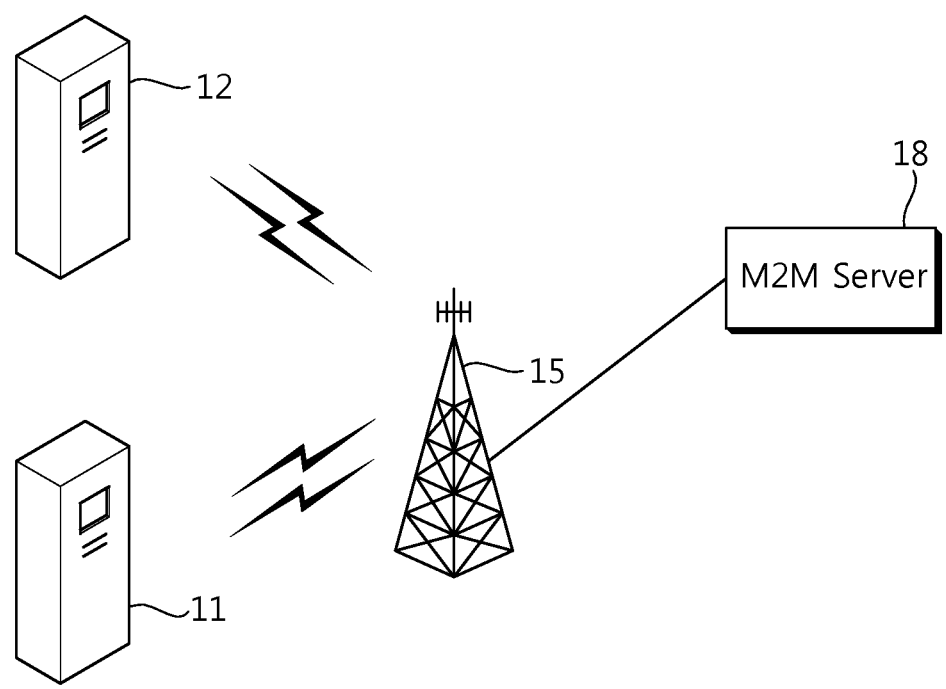
FIG. 1 shows an example of M2M (Machine To Machine) communication.

FIG. 1 shows an example of M2M (Machine To Machine) communication.

The M2M communication is also called a Machine Type Communication (MTC), and refers to information exchange between M2M devices 11 and 12 via a Base Station (BS) 15 without human interactions and information exchange between the M2M device 11 and a M2M server 18 via the BS.

The M2M server 18 is an entity for communicating with the M2M device 11. The M2M server executes a M2M application, and provides a M2M-specific service to the M2M device 11.

The M2M device 11 is a wireless device for providing the M2M communication, and may be fixed or mobile. The M2M device may also be called as a MTC device.

A service provided using the M2M communication may be differentiated from the conventional communication service requiring human intervention, and its service range is various, such as tracking, metering, payment, medical field services, remote controlling, etc.

Representative examples of individual service requirements of M2M features may be as follows.

1) Time controlled feature: This is a case in which the M2M device transmits or receives data only in a pre-defined specific duration. Therefore, unnecessary signaling performed outside the pre-defined specific duration can be avoided.

2) Time tolerant feature: This is a case in which the M2M device can delay data delivery. If a network load is greater than a pre-determined load threshold, a network operator can restrict network access of the M2M device or data transmission to another MTC device, and can dynamically restrict an amount of data that can be delivered by the MTC device in a specific region.

3) Offline indication feature: This is a case in which a notification is requested to the M2M device at a proper time when signaling is no longer possible between the M2M device and the network.

4) PAM (Priority Alarm Message) feature: This is a case in which, at the occurrence of a theft, a vandalism, or an emergency situation requiring an immediate attention, the M2M device preferentially reports this to the network.

It is considered that hundreds to thousands of M2M devices are deployed in one cell (or BS). Accordingly, it is difficult to identify the M2M devices by using only the existing user equipment identifiers, and thus the following identifier is taken into account.

Station identifier (STID): The STID is used to identify the M2M devices in the domain of the BS. The BS may assign the same STID to multiple M2M devices.

M2M Group Identifier (MGID): The MGID is a 12-bit value that uniquely identifies a downlink multicast service flow shared by a group of M2M devices within an M2M Group Zone. The M2M Group Zone is a logical zone comprising one or more BSs. An M2M Group Zone is identified by a M2M GROUP ZONE ID. The MGID may be assigned during dynamic service addition (DSA) procedure. The assigned MGID may be retained by the M2M device even in idle state unless the M2M device exits from the network or the network explicitly deletes the service flow associated with the MGID.

Now, the idle mode operation in an IEEE 802.16m-based system will be described with reference to IEEE (Institute of Electrical and Electronics Engineers) P802.16m/D10 "Part 16: Air Interface for Broadband Wireless Access Systems: Advanced Air Interface" released at Nov. 24, 2010. However, a wireless communication system to which the present invention is applied is not limited to the IEEE 802.16m-based system. Thus, the present invention may also be applicable to various wireless communication systems such as 3GPP (3rd Generation Partnership Project) LTE (Long Term Evolution), etc.

Figure 2:
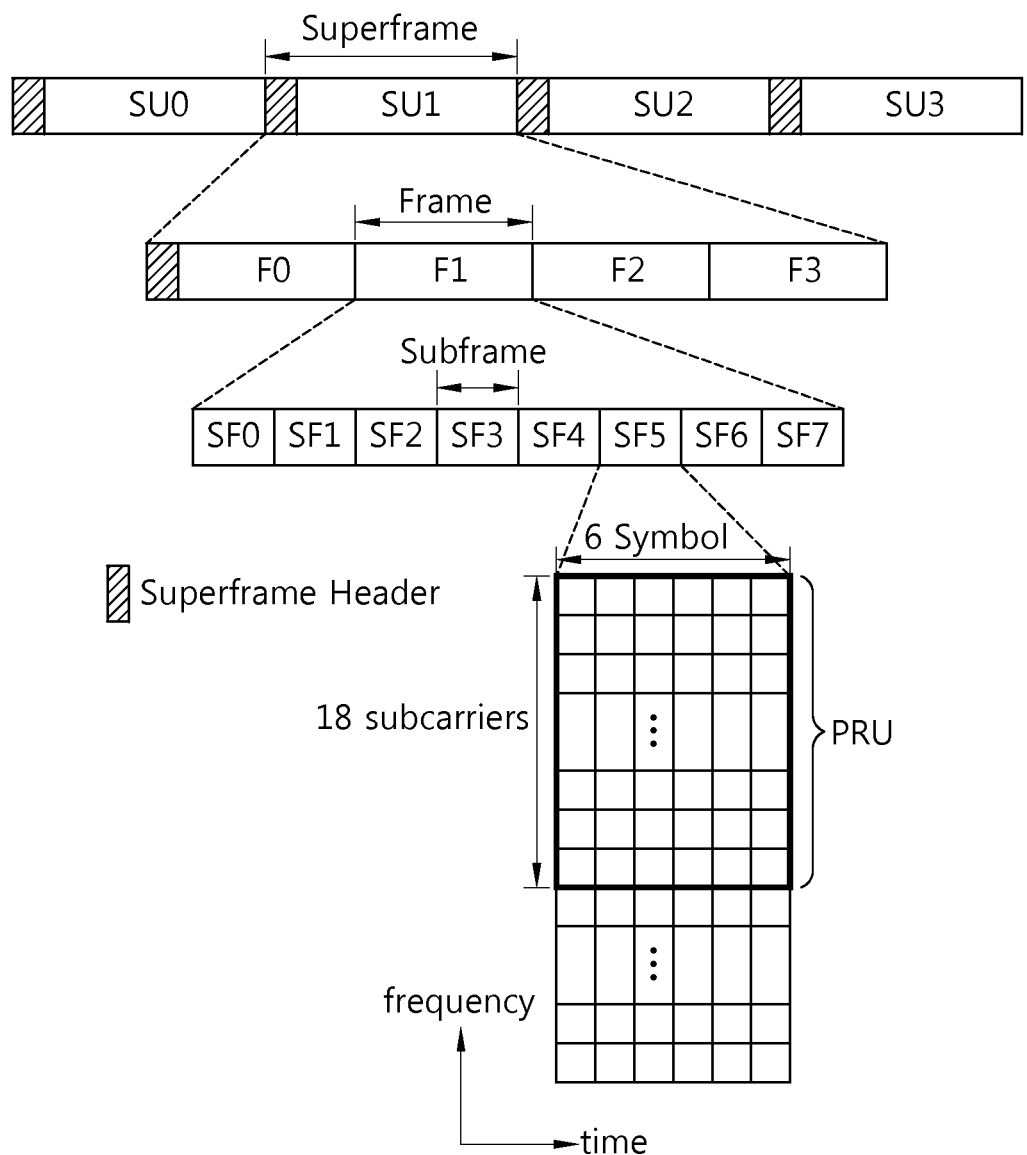
FIG. 2 shows an exemplary frame structure of an IEEE 802.16m system.

FIG. 2 shows an exemplary frame structure of an IEEE 802.16m system.

A Superframe (SF) includes a Superframe Header (SFH) and four frames F0, F1, F2, and F3. Each frame may have the same length in the SF. A size of the SF is 20 ms, and a size of each frame is 5 ms.

The frame includes a plurality of subframes SF0, SF1, SF2, SF3, SF4, SF5, SF6, and SF7. The subframe can be used for uplink transmission or downlink transmission. The subframe includes a plurality of Orthogonal Frequency Division Multiplexing (OFDM) symbols in a time domain. The OFDM symbol is for expressing one symbol period, and there is no limitation in a multiple access scheme or terminologies The subframe includes 6 OFDM symbols. This is for exemplary purposes only. The subframe may include 5, 7, or 9 OFDM symbols, and the present invention is not limited thereto.

A subframe type can be defined according to the number of OFDM symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols.

A Time Division Duplex (TDD) scheme or a Frequency Division Duplex (FDD) scheme can be applied to the frame. Subframes included in a TDD frame can be divided into uplink subframes and downlink subframes.

The size of the SF, the number of frames included in the SF, the number of subframes included in the frame, and the number of OFDM symbols included in the subframe may change, and the present invention is not limited thereto.

The SFH can carry an essential system parameter and system configuration information. The SFH can be transmitted in the last 5 OFDM symbols of the first subframe included in the SF.

A Physical Resource Unit (PRU) is a basic resource assignment unit, and includes 18 subcarriers in consecutive OFDM symbols in the same subframe.

In IEEE 802.16 system, an Advanced-MAP (A-MAP) carries service control information. A non-user specific A-MAP carries information which is not limited to a specific user or a specific user group. A Hybrid Automatic Repeat Request (HARQ) Feedback A-MAP carries HARQ ACK/NACK information regarding uplink data transmission. A Power Control A-MAP carries a power control command for a mobile station (MS).

An Assignment A-MAP carries resource assignment information. The Assignment A-MAP includes several types of A-MAPs, such as a Downlink (DL) Basic Assignment A-MAP, a Uplink (UL) Basic Assignment A-MAP, a Code Division Multiple Access (CDMA) Allocation A-MAP, etc.

The CDMA Allocation A-MAP includes a UL resource assignment based on a band request or a UL resource assignment based on a ranging request.

All A-MAPs share a physical resource region called an A-MAP region. The A-MAP region exists in each DL subframe.

The A-MAP is one example of control information for communication between the BS and the MS in the IEEE 802.16-based system. The A-MAP can be called variously, for example, control information, control channels, resource assignment information, etc., according to a wireless communication system.

Figure 3:
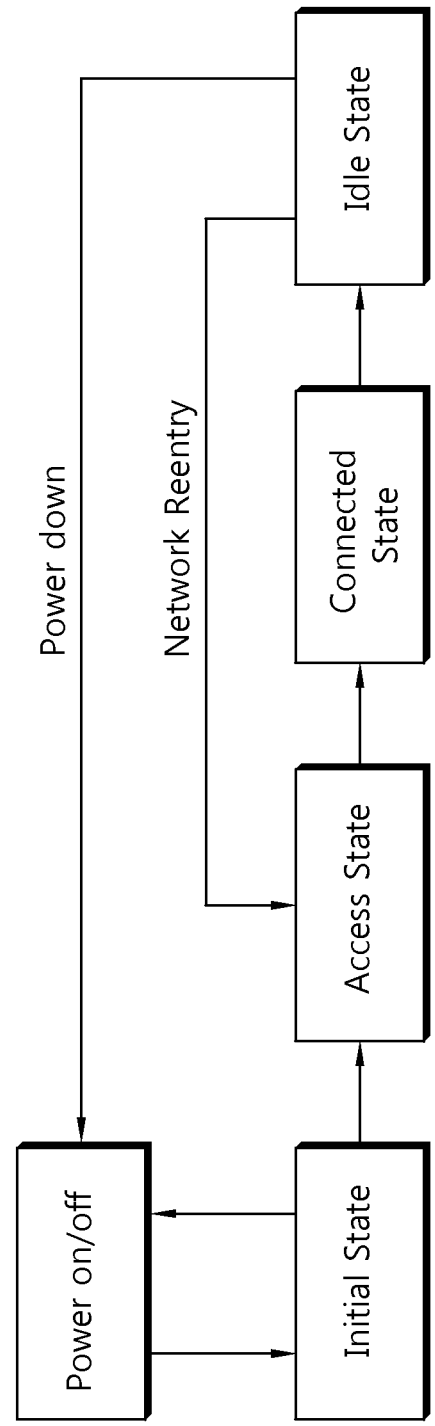
FIG. 3 shows an operation transition diagram in IEEE 802.16m.

FIG. 3 shows an operation transition diagram in IEEE 802.16m.

In an initialization state, a mobile station (MS) may perform cell selection by receiving synchronization and system configuration.

In an access state, the MS may perform a network entry. The network entry is a process including ranging, basic capability negotiation, and authentication with respect to a BS.

In a connected state, the MS may operate in any one of a sleep mode, an active mode, and a scanning mode. During the connected state, the MS maintains a connection established during the connected state. The MS in the active mode can always transmit or receive scheduled data. In the sleep mode, a radio frame is divided into a sleep window and a listening window. The MS in the sleep mode can receive data from the BS during the listening window. The MS in the scanning mode performs measurement instructed by the BS.

In the idle state, the MS may operate in the idle mode. The idle mode includes a paging listening interval and a paging unavailable interval. The BS may not transmit any DL traffic (e.g., a paging message, etc.) to the MS during paging unavailable interval. During paging unavailable interval, the MS may power down, scan neighbor BSs, select a preferred BS, conduct ranging, or perform other activities for which the MS will not guarantee availability to any BS for DL traffic. The MS may derive the start of the paging listening interval based on a paging cycle and a paging offset. One paging cycle includes the paging listening interval and the paging unavailable interval. The paging offset may be used to determine a superframe within the paging cycle from which the paging listening interval starts.

Ranging is a procedure used to initiate or keep UL synchronization. Ranging is the process of acquiring the correct timing offset, frequency offset, and power adjustments so that the MS's transmissions are aligned with the BS, and they are received within the appropriate reception thresholds. There are two types of ranging: initial ranging and periodic ranging. After DL synchronization, the MS attempts to perform initial ranging with the BS. If the ranging procedure is successfully completed, the MS is UL synchronized with the BS. Periodic ranging is the process of maintaining the correct MS's UL transmission parameters.

Figure 4:
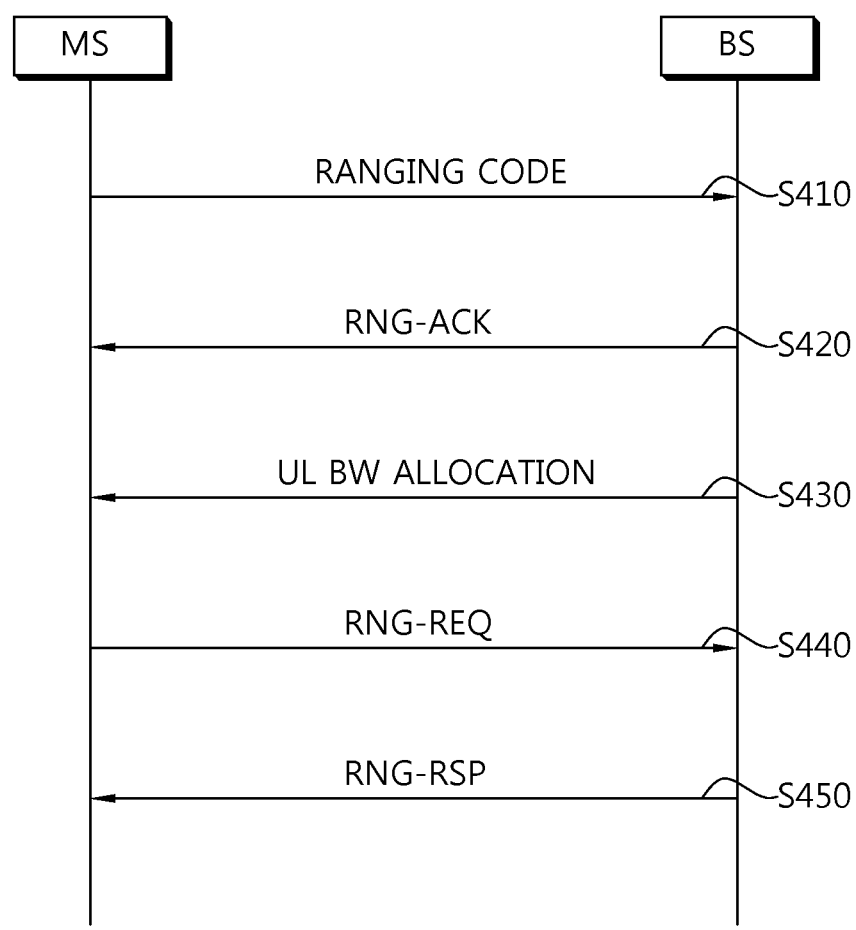
FIG. 4 is a flowchart showing a process for initial ranging in IEEE 802.16m.

FIG. 4 is a flowchart showing a process for initial ranging in IEEE 802.16m.

In step S410, after acquiring DL synchronization and UL transmission parameters, a MS selects one ranging code and one ranging channel, and transmits the selected ranging code to a BS at the selected ranging channel. The MS may select the ranging channel from all available ranging channels using random backoff.

In step S420, the BS transmits a ranging acknowledgement (RNG-ACK) message in response to the ranging code.

In step S430, upon receiving a 'Success' status notification in the RNG-ACK, the MS receives an UL BW allocation (i.e. CDMA Allocation A-MAP). If the MS has not received the CDMA Allocation A-MAP for UL BW allocation, the MS may restart the initial ranging procedure In step S440, when receiving the UL BW allocation, the MS sends a ranging request (RNG-REQ) message.

In step S450, the BS sends a ranging response (RNG-RSP) message in response to the RNG-REQ message.

In an idle mode, the MS may transmit a ranging code for the network re-entry. The ranging code is randomly selected by the MS from a plurality of code sets, and this is called contention based ranging.

In M2M communication, there may be hundreds to thousands of M2M devices in domain of one BS. Since the number of M2M device is very large, the possibility of collision in contention based ranging may increase significantly.

A low battery consumption is one of key design factors for M2M device. Repeated ranging due to collision may deteriorate battery efficiency.

Therefore, to reduce the possibility of collision in contention based ranging, dedicated ranging channel allocation (i.e. ranging opportunity) for M2M device has been proposed. A ranging channel dedicated to a M2M device is assigned before performing ranging. The M2M device transmits a ranging code by using the dedicated ranging channel. This dedicated ranging channel allocation can lower the possibility of collision.

However, the currently discussed dedicated ranging channel allocation does not consider the operation of the idle mode.

The present invention proposes how the dedicated ranging channel is allocated to the M2M device in the idle mode.

The present invention also proposes how the M2M device deals the dedicated ranging channel when a plurality of dedicated ranging channel are allocated to the M2M device.

There are two types of IDs that can be assigned to the M2M device in the idle mode.

(1) Fixed M2M Deregistration ID (FMDID): The FMDID is a 16-bit value that uniquely identifies a M2M device in domain of a BS. The FMDID is assigned to the M2M device by the BS during idle mode entry and released during the network reentry.

(2) Deregistration identifier (DID): The DID is a 18-bit value used to identify a device in an idle mode within a set of paging group ID, paging cycle and paging offset. The network may assign the DID to each device during idle mode initiation.

It can be said that FMDID is used to identify the M2M device in domain of BS and DID is used to identify the M2M device in domain of paging group or paging controller.

Figure 5:
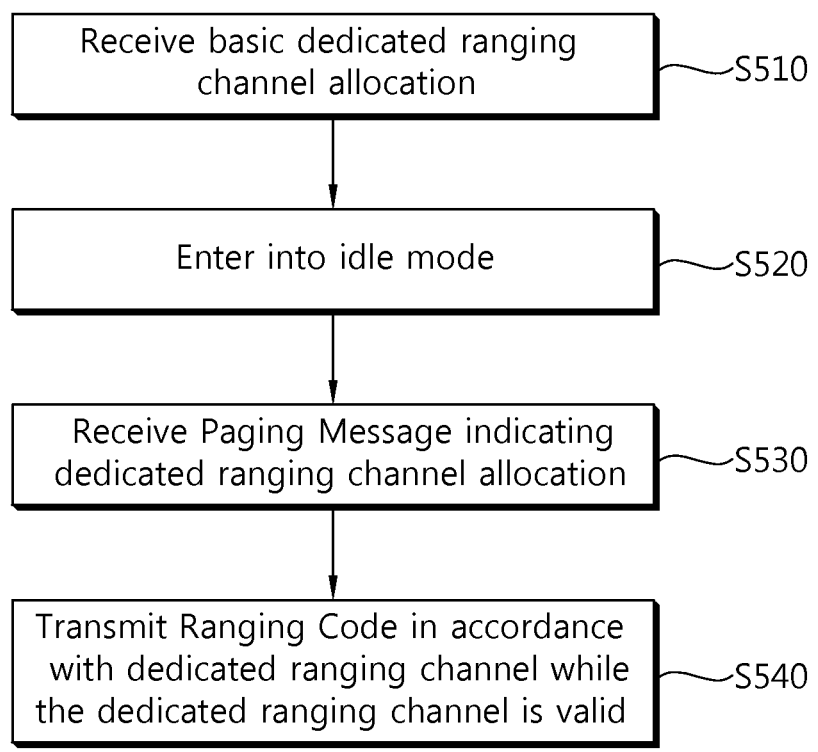
FIG. 5 is a flowchart showing a method for performing a ranging according to an embodiment of the present invention.

FIG. 5 is a flowchart showing a method for performing a ranging according to an embodiment of the present invention.

In step S510, a M2M device receives basic dedicated ranging channel allocation from a BS. The basic dedicated ranging channel allocation may be included in a System Configuration Descriptor (SCD) message.

The SCD message may be broadcast by the BS at a periodic interval to define a system configuration. A Configuration Change Count in the SCD message may be incremented by 1 modulo 16 whenever the contents of this message are changed.

Table 1 shows an exemplary format of the SCD message.

TABLE 1

| Field | Size (bits) | Description |
|---|---|---|
| Configuration Change Count | 4 | The value is increased whenever the contents of this message except the dedicated ranging channel information for M2M device are changed. The value rolls over from 0 to 15. |
| M2M Configuration Change Count | 4 | The value is increased whenever the contents of the dedicated ranging channel information for M2M device are changed. The value rolls over from 0 to 15. |

TABLE 1-continued

| Field | Size (bits) | Description |
|---|---|---|
| M2M ranging indicator | 2 | Indicate the ranging configuration for M2M devices.<br>0b00: normal ranging<br>0b01: dedicated ranging channel allocation for M2M devices<br>0b10: M2M devices are not allowed to perform network reentry |
| If (M2M ranging indicator == 0b01) { | | |
| ranging opportunity | 3 | Indicates subframe index of the allocated ranging opportunity dedicated for M2M devices. |
| M2M periodicity | 3 | Indicates the periodicity of the ranging dedicated for M2M devices.<br>0b000: transmission in every frame<br>0b001: transmission in the first frame in every superframe<br>0b010: transmission in the first frame in every even numbered superframe, i.e., mod (superframe number, 2) = 0<br>0b011: transmission in the first frame in every 4th superframe, i.e., mod (superframe number, 4) = 0 |
| } | | |

The basic dedicated ranging channel allocation includes dedicated ranging channel information (i.e. ranging opportunity and/or M2M periodicity) allocated by the SCD message when M2M ranging indicator is set to 0b01.

In step S520, the M2M device enters into the idle mode. The entering into the idle mode can be performed at a request of the M2M device or at a command from a BS.

For example, in order for the M2M device to enter into the idle mode, in step S511, the M2M device may send to the BS a Deregistration-Request (DREG-REG) message for requesting the entering into the idle mode. In step S512, the M2M device may receive from the BS a Deregistration-Response (DREG-RSP) message for instructing the start of the idle mode.

Alternatively, the BS may transmit a Deregistration-Command (DREG-CMD) message to allow the M2M device to enter into the idle mode.

In step S530, the M2M device receives a paging message from the BS. The paging message may be a paging advertisement (PAG-ADV) message.

The PAG-ADV message may indicate dedicated ranging channel allocation in which the PAG-ADV message includes dedicated ranging channel information.

The PAG-ADV message may be a group paging message and/or an individual paging message. The group paging message include a MGID and the individual paging message includes DID and/or FMDID.

Table 2 below shows an exemplary format of the PAG-ADV message.

TABLE 2

| Field | Size (bits) | Description |
|---|---|---|
| MGID | 12 | M2M Group ID |
| M2M Group Zone Index | 2 | A zone Index corresponding to an M2M GROUP ZONE ID. Present if a BS is part of more than one M2M Group Zone. |
| Action Code | 2 | 0b00: Performing network reentry<br>0b01: Performing location update |
| network access type | 2 | Indicate the network access scheme for M2M device<br>0b01: dedicated ranging channel allocation for synchronized device<br>0b10: dedicated ranging channel allocation for unsynchronized device |
| If (network access type == 0b01 | 0b10) { | | |
| ranging opportunity | 3 | Indicates subframe index of the allocated ranging opportunity dedicated for M2M devices. |
| M2M periodicity | 3 | Indicates the periodicity of the ranging dedicated for M2M devices.<br>0b000: transmission in every frame<br>0b001: transmission in the first frame in every superframe<br>0b010: transmission in the first frame in every even numbered superframe, i.e., mod (superframe number, 2) = 0<br>0b011: transmission in the first frame in every 4th superframe, i.e., mod (superframe number, 4) = 0 |
| Dedicated Channel Allocation Timer | | Time duration in which dedicated ranging channel allocation (i.e., ranging opportunity and/or M2M periodicity) is valid. Be included if the BS allocates dedicated ranging channel in addition to the basic dedicated ranging channel allocation. |
| } | | |

The Dedicated Channel Allocation Timer may be used to define the validity of the dedicated ranging channel allocation in the PAG-ADV message. The allocated dedicated ranging channel may be valid within the Dedicated Channel Allocation Timer.

Two dedicated ranging channels may be allocated to the M2M device in the idle mode. While the Dedicated Channel Allocation Timer is running, the dedicated ranging channel allocation in the PAG-ADV message is valid but the basic dedicated ranging channel allocation is not valid. If the Dedicated Channel Allocation Timer expires, the basic dedicated ranging channel allocation may be valid.

If the dedicated ranging channel allocation which is allocated through the PAG-ADV message is different with the basic dedicated ranging channel allocation which is allocated via the SCD message, the Dedicated Channel Allocation Timer may be included in the PAG-ADV message.

In step S540, the M2M device selects one ranging code and transmits the selected ranging code in accordance with the dedicated ranging channel allocation within the Dedicated Channel Allocation Timer.

The BS can assign to the M2M device a plurality of dedicated ranging channels via SCD message and/or paging message. The M2M device can select one of the plurality of dedicated ranging channels based on the Dedicated Channel Allocation Timer.

Using dedicated ranging channel in contention based ranging, the possibility of collision can decrease and batter consumption due to ranging can be reduced.

In the above tables, a field name, a size, and a field value are for exemplary purposes only, and thus can be easily modified to other names and other values by those ordinarily skilled in the art. Not all of the fields proposed in the table are essential, and thus a specific field can be omitted or added.

Figure 6:
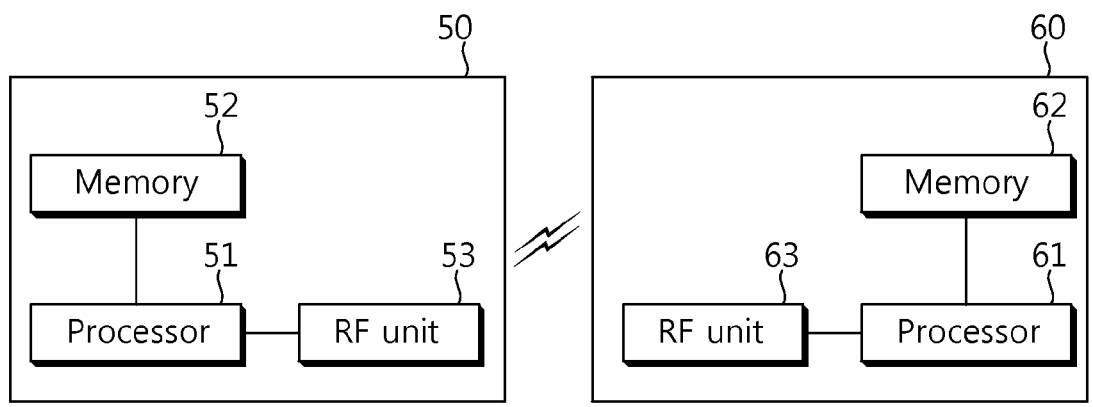
FIG. 6 is a block diagram showing a wireless communication system to implement an embodiment of the present invention.

FIG. 6 is a block diagram showing a wireless communication system to implement an embodiment of the present invention.

A M2M device 50 includes a processor 51, memory 52, and a radio frequency (RF) unit 53. The memory 52 is connected to the processor 51 and configured to store various information used for the operations for the processor 51. The RF unit 53 is connected to the processor 51 and configured to send and/or receive a radio signal. The processor 51 implements the proposed functions, processed, and/or methods. In the described embodiment of FIG. 5, the operation of the M2M device may be implemented by the processor 51. The processor 51 may receive dedicate ranging channel allocation and perform ranging using the dedicate ranging channel allocation.

A BS 60 includes a processor 61, memory 62, and an RF unit 63. The memory 62 is connected to the processor 61 and configured to store various information used for the operations for the processor 61. The RF unit 63 is connected to the processor 61 and configured to send and/or receive a radio signal. The processor 61 implements the proposed functions, processed, and/or methods. In the described embodiment of FIG. 5, the operation of the BS may be implemented by the processor 61. The processor 61 may sends the SCD message and the paging message to allocate dedicated ranging channel.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a ranging for Machine To Machine (M2M) communication, comprising:
periodically receiving, by a M2M device, a system configuration descriptor message including first dedicated ranging channel allocation information;
entering, by the M2M device, into an idle mode;
receiving, by the M2M device in the idle mode, a paging message from a base station, the paging message including second dedicated ranging channel allocation information and a dedicated channel allocation timer; and
transmitting, by the M2M device, a ranging code to the base station in accordance with the second dedicated ranging channel allocation information when the second dedicated ranging channel allocation information is valid,
wherein the second dedicated ranging channel allocation information included in the paging message is valid within a time duration indicated by the dedicated channel allocation timer when the second dedicated ranging channel allocation information in the paging message is different from the first dedicated ranging channel allocation information allocated via the system configuration descriptor message, and
wherein the first and second dedicated ranging channel allocation information are used for performing a ranging procedure.

2. The method of claim 1, wherein the first and second dedicated ranging channel allocation information include a ranging opportunity and a M2M periodicity, the ranging opportunity indicating at least one subframe in which the ranging code can be transmitted, the M2M periodicity indicating a periodicity for performing the ranging dedicated to the M2M device.

3. The method of claim 1, wherein the paging message further includes a M2M group identifier that identifies a M2M group to which the M2M device belongs.

4. A Machine To Machine (M2M) device configured for performing a ranging for M2M communication, comprising:
a radio frequency unit for receiving and transmitting a radio signal; and
a processor operatively coupled with the radio frequency unit and configured to:
periodically receive a first system configuration descriptor message including dedicated ranging channel allocation information;
enter into an idle mode;
receive a paging message from a base station, the paging message including second dedicated ranging channel allocation information and a dedicated channel allocation timer; and instruct the radio frequency unit to transmit a ranging code to the base station in accordance with the second dedicated ranging channel allocation information when the second dedicated ranging channel allocation information is valid, wherein the second dedicated ranging channel allocation information included in the paging message is valid within a time duration indicated by the dedicated channel allocation timer when the second dedicated ranging channel allocation information allocated through the paging message is different from the first dedicated ranging channel allocation information allocated via the system configuration descriptor message, and wherein the first and second dedicated ranging channel allocation information are used for performing a ranging procedure.

5. The M2M device of claim 4, wherein the first and second dedicated ranging channel allocation information include a ranging opportunity and a M2M periodicity, the ranging opportunity indicating at least one subframe in which the ranging code can be transmitted, the M2M periodicity indicating a periodicity for performing the ranging dedicated to the M2M device.

6. The M2M device of claim 4, wherein the paging message further includes a M2M group identifier that identifies a M2M group to which the M2M device belongs.

* * * * *